United States Patent
Dotan

(10) Patent No.: US 8,370,389 B1
(45) Date of Patent: Feb. 5, 2013

(54) TECHNIQUES FOR AUTHENTICATING USERS OF MASSIVE MULTIPLAYER ONLINE ROLE PLAYING GAMES USING ADAPTIVE AUTHENTICATION

(75) Inventor: Yedidya Dotan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 345 days.

(21) Appl. No.: 12/751,057

(22) Filed: Mar. 31, 2010

(51) Int. Cl.
*G06F 7/00* (2006.01)
*G06F 17/30* (2006.01)

(52) U.S. Cl. .................. 707/784; 707/781; 707/783

(58) Field of Classification Search ............. 707/793, 707/796, 781, 694, 783, 784
See application file for complete search history.

(56) References Cited

U.S. PATENT DOCUMENTS

| | | | |
|---|---|---|---|
| 5,465,387 A * | 11/1995 | Mukherjee | 455/26.1 |
| 6,842,860 B1 * | 1/2005 | Branstad et al. | 713/170 |
| 7,363,492 B2 * | 4/2008 | Kuhlman et al. | 713/166 |
| 7,780,532 B2 | 8/2010 | Van Luchene | |
| 7,810,147 B2 | 10/2010 | Duane et al. | |
| 7,955,175 B1 | 6/2011 | Holloway et al. | |
| 8,137,194 B1 | 3/2012 | Kelly et al. | |
| 8,182,320 B2 | 5/2012 | Coleman et al. | |
| 8,221,215 B2 * | 7/2012 | Walker et al. | 463/20 |
| 2005/0097320 A1 * | 5/2005 | Golan et al. | 713/166 |
| 2007/0111794 A1 * | 5/2007 | Hogan et al. | 463/42 |
| 2008/0227552 A1 * | 9/2008 | Shimomura et al. | 463/42 |
| 2009/0137321 A1 * | 5/2009 | Katsume et al. | 463/42 |
| 2009/0215540 A1 * | 8/2009 | Perlman et al. | 463/42 |
| 2011/0065500 A1 * | 3/2011 | Gould | 463/29 |

* cited by examiner

*Primary Examiner* — Kimberly Wilson
*Assistant Examiner* — Hexing Liu
(74) *Attorney, Agent, or Firm* — BainwoodHuang

(57) ABSTRACT

A technique authenticates a user of a massively multiplayer online role playing game (MMORPG). The technique involves establishing a user database containing user information describing the MMORPG user based on a set of first transmissions received from a game provider of the MMORPG. The technique further involves (i) receiving a second transmission from the game provider, the second transmission including an authentication request to authenticate the MMORPG user, and (ii) providing a response transmission to the game provider in response to the second transmission. The response transmission includes an authentication result based on an adaptive authentication operation involving the user database. The authentication result controls whether the game provider provides the MMORPG user with current access to the MMORPG.

15 Claims, 6 Drawing Sheets

TECHNIQUES FOR AUTHENTICATING USERS OF MASSIVE MULTIPLAYER ONLINE ROLE PLAYING GAMES USING ADAPTIVE AUTHENTICATION

BACKGROUND

A massively multiplayer online role-playing game (MMORPG) is an electronic game which is played by multiple players over the Internet. In general, a provider of a MMORPG offers each MMORPG player the ability to play the MMORPG in exchange for a subscription fee (e.g., an annual or monthly fee) and/or individual transaction fees (e.g., a la carte fees).

Typically, to play the MMORPG, the MMORPG player first signs in or logs in to an account using a computerized device (e.g., a computer, a particular game platform, a palm or handheld portable device, etc.). To this end, the MMORPG player enters a user identifier (e.g., a username, a user number, etc.) and a confidential password (e.g., a string of characters). If the entered confidential password matches the MMORPG provider's copy of the confidential password, the MMORPG provider allows the player to play the MMORPG.

Once the MMORPG player has signed in, the MMORPG player is able to participate in the MMORPG with other MMORPG players. In particular, the MMORPG player interacts with the other MMORPG players by operating a virtual character in a persistent virtual world. For example, the MMORPG player may be able to direct the virtual character to discover virtual treasure and virtual armor in the virtual world. The MMORPG player may be able to direct the virtual character to trade virtual items with other virtual world characters, and so on. In some situations, the MMORPG player may be able to improve certain attributes of the virtual character (e.g., purchase additional virtual lives or virtual items, upgrade virtual health, improve virtual armor, add virtual experience and/or virtual currency, etc.) by paying a fee to the MMORPG provider (i.e., a microtransaction).

SUMMARY

Unfortunately, there are deficiencies to the above-described MMORPG environment. In particular, it may be possible for a fraudster to infiltrate the MMORPG environment and swindle MMORPG players as well as the MMORPG provider. For example, a fraudster such as a phishing site could steal the user identifier and the confidential password from a MMORPG player and hijack the MMORPG player's account. Along these lines, the fraudster may take over the MMORPG player's virtual character and direct the MMORPG player's virtual character to give away or lose some or all of the virtual character's virtual items and currency. Furthermore, the fraudster may be able to spend actual currency or virtual currency from the hijacked account (i.e., unauthorized microtransactions), infiltrate the MMORPG provider with malware, and so on.

In contrast to the above-described conventional MMORPG environment, improved techniques involve authenticating a user of a MMORPG using adaptive authentication for the gaming industry. That is, a MMORPG provider exchanges information on its individual MMORPG players with an adaptive authentication server performing adaptive authentication to catch and remove fraudsters. Such adaptive authentication may involve analysis of particular user attributes (e.g., the MMORPG player's unique device attributes, ISP address, location, etc.). Additionally, such adaptive authentication may involve behavioral analysis of the particular MMORPG playing sessions of the user (e.g., a comparison of playing time of day, amount of playing time, playing speed, purchase habits, the player's unique click stream, and other playing activity). Accordingly, the adaptive authentication server is able to evaluate potential risks of fraud (i.e., generate risk scores which assess the risk of fraudsters) and provide input back to the MMORPG provider to allow the MMORPG provider to take action (e.g., contact the user, temporarily deny or disable access to the user's account, and so on). In particular, such operation protects users from identity theft and/or misuse of credit information. Additionally, such operation protects the MMORPG provider from multiple users using the same account.

Some embodiments are directed to a method of authenticating a user of a MMORPG. The method includes establishing a user profile database containing the user's information describing the MMORPG user based on a set of first transmissions received from a game provider of the MMORPG. The method further includes (i) receiving a second transmission from the game provider, the second transmission including an authentication request to authenticate the MMORPG user, and (ii) providing a response transmission to the game provider in response to the second transmission. The response transmission includes an authentication result based on an adaptive authentication operation involving the user database. The authentication result controls whether the game provider provides the MMORPG user with current access to the MMORPG.

Additionally, some embodiments are directed to an adaptive authentication server which authenticates users of a MMORPG. In some arrangements, the MMORPG provider communicates with the adaptive authentication server out-of-band from the MMORPG users so that the MMORPG users do not need to alter how they operate with the MMORPG provider. Furthermore, in some arrangements, the MMORPG provider is able to communicate with the user using out-of-band communications such as a phone call, an email, a text message, a short message service (SMS) communication, etc.

Furthermore, some embodiments are directed to a computer program product including a computer readable storage medium storing instructions which cause a computer to operate as the adaptive authentication server. In some arrangements, the instructions are compiled and linked executable code. In other arrangements, the instructions are scripts or rules which are dynamically translated and then performed by the computer.

It should be understood that the above-described adaptive authentication server is capable of utilizing RSA® Adaptive Authentication which is offered by EMC Corporation of Hopkinton, Mass. Certain aspects of RSA® Adaptive Authentication relate to risk-based authentication (RBA) and fraud detection which involve measuring over one hundred risk indicators to identify high-risk and suspicious activities. Additionally, the system is equipped for the financial vertical by taking into account transaction data or protecting a simple web application at login across many verticals. Certain aspects of RSA® Adaptive Authentication are powered by risk-based authentication technology that conducts a risk assessment of all users behind the scenes. A unique risk score is assigned to each activity, and users are only challenged when an activity is identified as high-risk and/or an organizational policy is violated. This transparent authentication enables organizations to increase security without compromising user convenience. Certain aspects of Adaptive Authentication monitor and authenticate activities based on risk, profiles, and policies by correlating: unique browser identification profiles, matching banking behavioral patterning profiles and inputs from our fraud intelligence teams that locate compromised ip addresses and accounts.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves authenticating a user of a massively multiplayer online role playing game (MMORPG) using adaptive authentication. Here, a MMORPG provider exchanges information regarding its MMORPG players with an adaptive authentication server which performs adaptive authentication operations to catch and remove fraudsters. Such operations may involve analyzing a user's attributes (e.g., the user's device address, ISP address, location, etc.). Additionally, such operations may involve analyzing certain behavior characteristics of the user's playing sessions (e.g., a comparison of playing time of day, amount of playing time, playing speed, purchase habits, and other playing activity). As a result, the adaptive authentication server is able to evaluate potential risks of fraud (i.e., generate risk scores) and provide input back to the MMORPG provider to allow the MMORPG provider to take action (e.g., contact the user, temporarily deny/disable the user's account, etc.).

Figure 1:
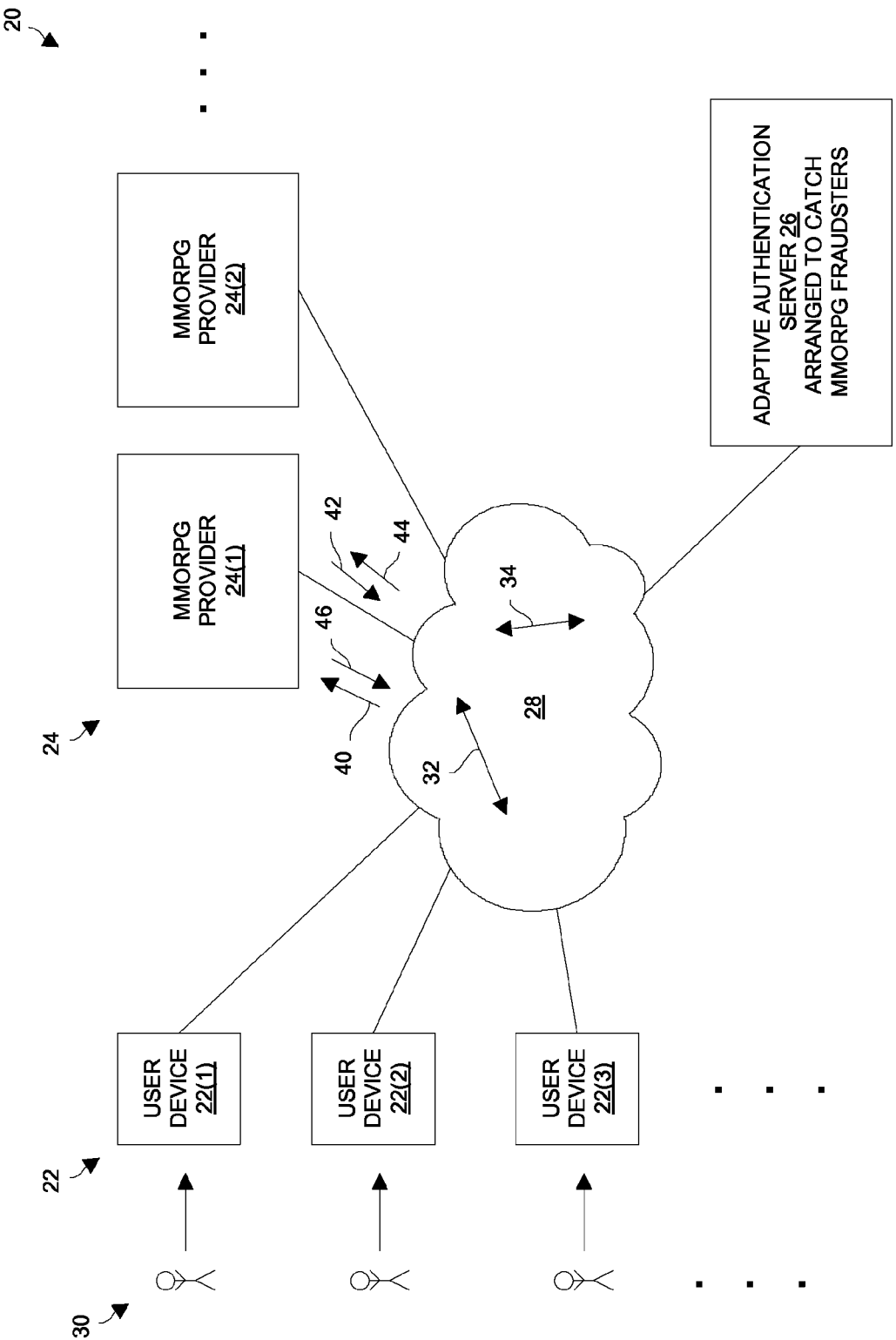
FIG. 1 is a block diagram of a MMORPG environment which utilizes adaptive authentication to authenticate MMORPG users.

FIG. 1 shows a MMORPG environment 20 which utilizes adaptive authentication to authenticate MMORPG users. The MMORPG environment 20 includes user devices 22(1), 22(2), 22(3), . . . (collectively, user devices 22), MMORPG providers 24(1), 24(2), . . . (collectively, game providers, 24), an adaptive authentication server 26, and a communications medium 28.

Each user device 22 is essentially an electronic apparatus through which a user 30 is able to participate in an MMORPG from at least one MMORPG provider 24. Examples of suitable electronic apparatus for the user devices 22 include general purpose computers, various manufacturer-specific gaming platforms, laptop computers, portable/wireless devices, and so on.

Each MMORPG provider 24 exchanges electronic gaming signals 32 with one or more of the user devices 22 to deliver online access to a particular MMORPG (e.g., an action-style MMORPG, a fantasy-style MMORPG, and so on). Additionally, each MMORPG provider 24 exchanges electronic message signals 34 with the adaptive authentication server 26 through the communications medium 28 to identify possible MMORPG fraudsters.

It should be understood that the communications medium 28 is constructed and arranged to convey the electronic signals 32, 34 between the various components of the MMORPG environment 20 effectively and efficiently. Along these lines, the electronic signals 32, 34 may take a variety of forms including electrical signals, optical signals, wireless signals, combinations thereof, and so on. Additionally, the communications medium 28 may implement a variety of protocols such as TCP/IP, UDP, ATM, Ethernet, combinations thereof, and the like. Furthermore, the communications medium 30 may include various components (e.g., cables, switches, gateways/bridges, NAS/SAN appliances/nodes, interfaces, etc.). Moreover, the communications medium 28 is capable of having a variety of topologies (e.g., hub-and-spoke, ring, backbone, multi-drop, point-to-point, irregular, combinations thereof, etc.).

It should be further understood that the adaptive authentication server 26 is equipped to perform adaptive authentication operations on behalf of multiple MMORPG providers 24 in an ongoing basis. However, for simplicity, the adaptive authentication server 26 will hereinafter be described as providing adaptive authentication for just one of the MMORPG providers 24, e.g., the MMORPG provider 24(1).

During operation, a MMORPG user 30 initially attempts to login with the MMORPG provider 24 in order to obtain access to a MMORPG. In particular, that MMORPG user 30 provides a login request 40 using a particular user device 22. The login request 40 may include a variety of identification information entered by the MMORPG user 30, as well as ancillary information (e.g., a device identifier from the user device 22, an ISP network address, a geographic location, etc.). The MMORPG provider 24 then sends a request transmission 42 through the communications medium 28 to the adaptive authentication server 26 directing the adaptive authentication server 26 to perform an adaptive authentication operation.

Next, the adaptive authentication server 26 performs the adaptive authentication operation in response to the request transmission 42, and returns a response transmission 44 to the MMORPG provider 24 through the communications medium 30. The response transmission 44 indicates whether the MMORPG provider 24 should grant access to the MMORPG user 30 using the particular user device 22. The MMORPG provider 24 then sends a login response 46 back to the user device 22 either allowing or disallowing further access. Further details will now be provided with reference to FIG. 2.

Figure 2:
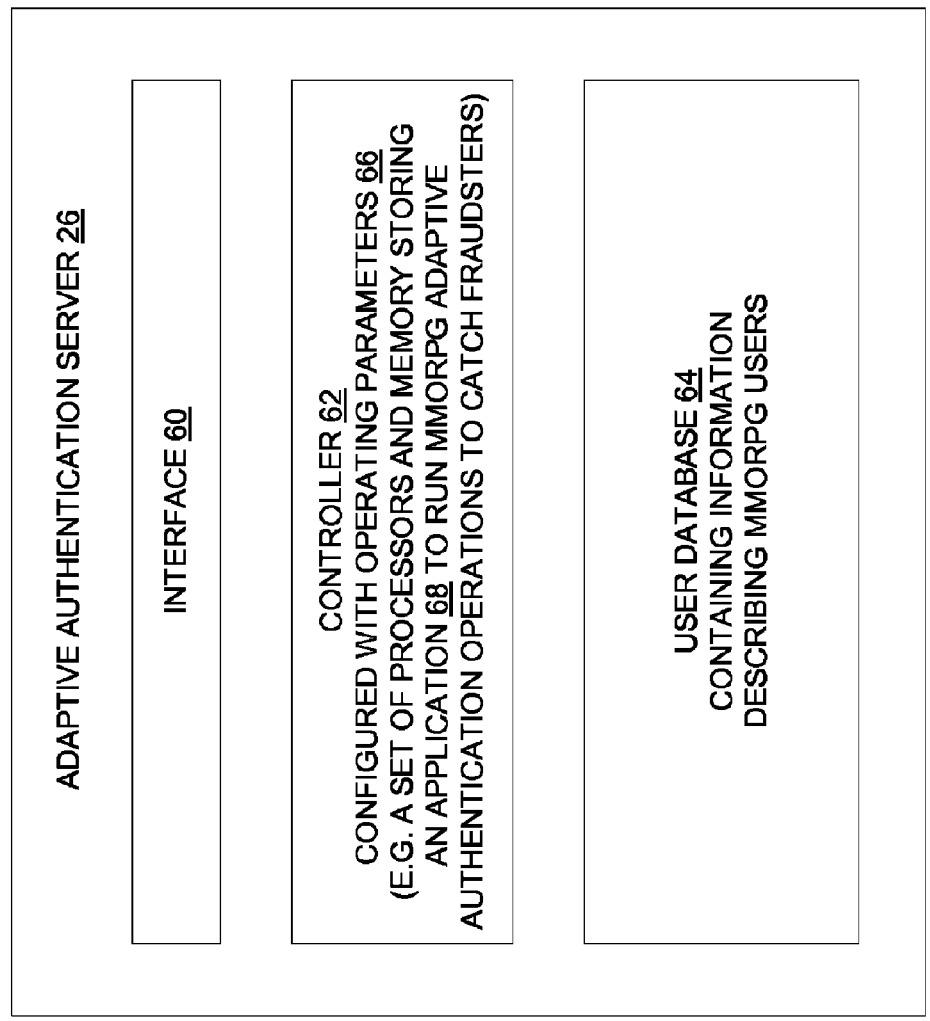
FIG. 2 is a block diagram of an adaptive authentication server of the MMORPG environment of FIG. 1.

FIG. 2 shows certain details of the adaptive authentication server 26. The adaptive authentication server 26 includes an interface 60, a controller 62, and a user database 64. The interface 60 enables the adaptive authentication server 26 to receive input and provide output. The user database 64 is constructed and arranged to store information describing MMORPG users 30.

The controller 62 is constructed and arranged to access the information in the user database 64 and perform adaptive authentication operations to catch fraudsters. During operation, the controller 62 utilizes certain operating parameters 66 for effective risk analysis.

For example, the controller 62 may generate a user attribute risk score (i.e., a result between 0 and 1000) indicating an amount of risk based on a comparison between earlier stored user attributes from the MMORPG provider 24 (e.g., location and address data) and currently received user attributes from the MMORPG provider 24. In this situation, the operating parameters 66 may include a predefined user attribute threshold so that a user attribute risk score above the user attribute threshold indicates a likely fraudster situation while a user attribute risk score below the user attribute threshold indicates an unlikely fraudster situation. In some arrangements, the user attribute risk score is an aggregation of individual weight risk analysis results from comparisons of individual attribute factors (e.g., device address, ISP address, geographic location, tracking cookie information, etc.).

Similarly, the controller 62 may generate a user behavior risk score (i.e., a result between 0 and 1000, but which is a different score than the user attribute risk score) indicating an amount of risk based on a comparison between earlier stored user behavior information from the MMORPG provider 24 (e.g., play times and play speed information, spending information, etc.) and recently received user behavior information from the MMORPG provider 24. In this situation, the operating parameters 66 may include a predefined user behavior threshold so that a user behavior risk score above the user behavior threshold indicates a likely fraudster situation while a user behavior risk score below the user behavior threshold indicates an unlikely fraudster situation. In some arrangements, the user behavior risk score is an aggregation of individual weight risk analysis results from comparisons of individual behavior factors (e.g., playing time of day, playing amount of time, play speed, average purchase amount, etc.).

In some arrangements, the controller 62 is implemented using a set of processors (e.g., processing boards, a microprocessor, etc.) and memory which stores, among other things, a specialized adaptive authentication application 68. In such arrangements, the controller 62 forms a specialized circuit when executing the specialized adaptive authentication application 68.

It should be understood that the specialized adaptive authentication application is capable of being delivered to and installed on the adaptive authentication server 26 from a computer program product 70 (illustrated generally by a diskette icon). Such a computer program product 70 includes a non-transitory computer readable storage medium which stores, in a non-volatile manner, instructions for performing the adaptive authentication operations. Examples of suitable computer readable storage media include CD-ROM, magnetic disk or tape cartridges, flash memory, disk memory, and the like. In addition to installing the adaptive authentication application locally, it should be understood that such specialized software may be made available as a service via the Internet (e.g., SaaS). Further details will now be provided with reference to FIG. 3.

Figure 3:
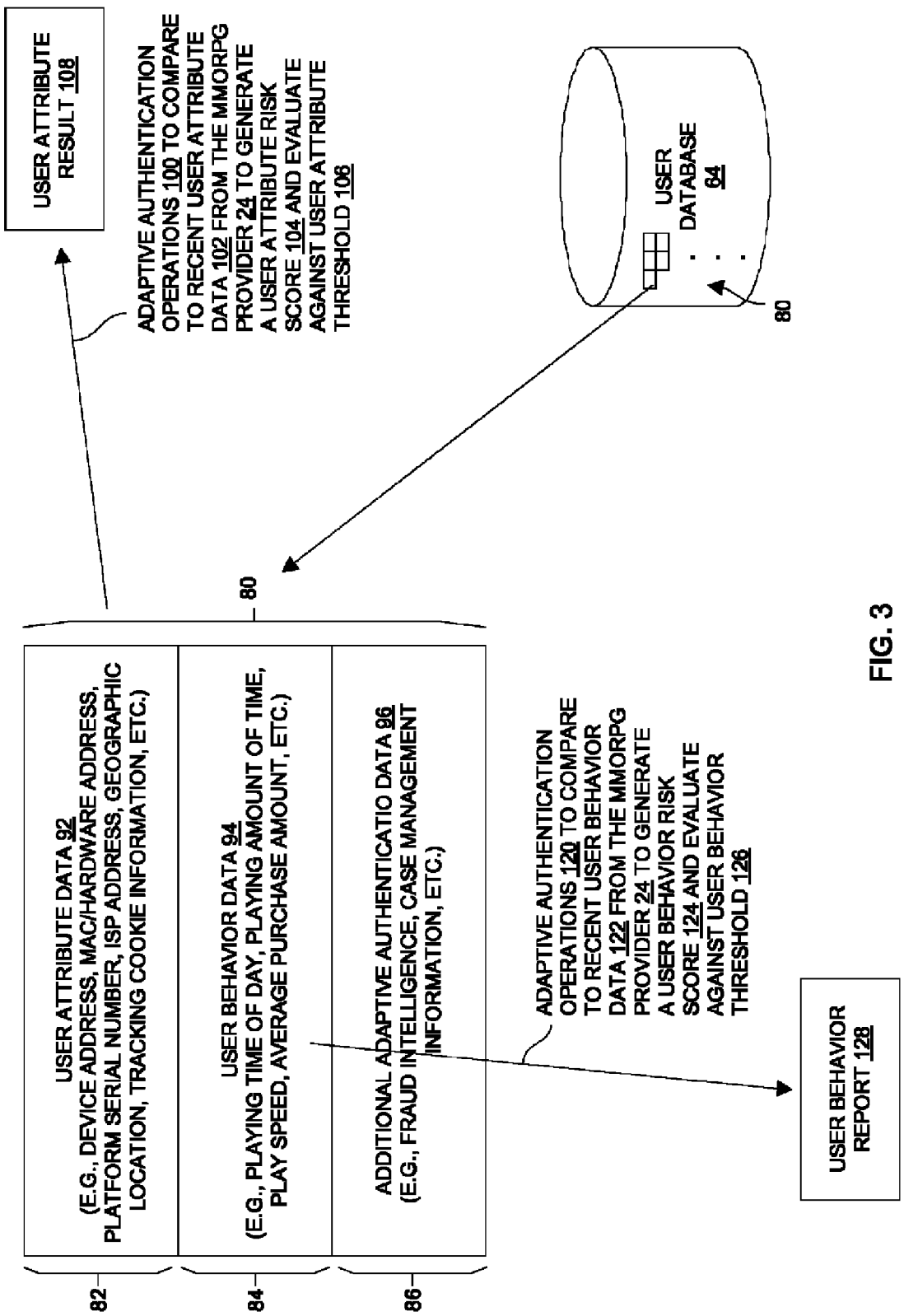
FIG. 3 is a block diagram showing particular aspects of a user database and how user information stored in the user database is utilized by the adaptive authentication server of FIG. 2.

FIG. 3 illustrates particular aspects of the user database 64 and how the information stored in the user database 64 is utilized by the adaptive authentication server 26 of FIG. 2. As shown, the user database 64 includes user entries 80 which define various features of the users 30 (also see FIG. 1). It should be understood that the adaptive operation of the adaptive authentication server 26 is ongoing in that the user database 64 initially stores values based on initial play and activity of the MMORPG users 30, i.e., based on initial transmissions from the MMORPG provider 24. As such play continues over time (e.g., days, months, years, etc.), the user database 64 accumulates more data and thus better defines certain user attributes and behaviors of the MMORPG users 30.

Each user entry 80 includes, for a particular MMORPG user 30, a set of user attribute fields 82, a set of behavior data fields 84, and additional adaptive authentication fields 86. The user attribute fields 82 are constructed and arranged to contain user attribute data 92 of that user 30 (e.g., device address, ISP address, geographic location, tracking cookie information, etc.). The user behavior fields 84 are constructed and arranged to contain user behavior data 94 of that user 30 (e.g., playing time of day, playing amount of time, play speed, average purchase amount, etc.). The additional adaptive authentication fields 86 are constructed and arranged to contain additional information such as data that is appropriate for fraud intelligence (e.g., a note indicating the user has user attributes/behavior which is highly correlated to hacking), case management (e.g., history of previous hacking), and so on.

As shown, the adaptive authentication server 26 performs operations 100 to determine whether to approve or deny user access in response to a current user login attempt. Here, the controller 62 (FIG. 2) of the adaptive authentication server 26 compares the user attribute data 92 to recent user attribute data 102 from the MMORPG provider 24 to generate a user attribute risk score 104 which is evaluated against a predefined user attribute threshold 106 (e.g., a tunable number between 0 and 1000). If the user attribute risk score 104 is lower than the user attribute threshold 106, the controller 62 gives a user attribute result 108 a first access value to grant the user 30 current access to the MMORPG. However, if the user attribute risk score 104 is higher than the user attribute threshold 106, the controller 62 gives the user attribute result 108 a second access value to deny the user 30 current access to the MMORPG.

Similarly, the adaptive authentication server 26 performs routine operations 120 to determine whether flag possible fraudster situations to the MMORPG provider 24 so that the MMORPG provider 24 can take remedial steps (e.g., follow-up with the user 30). In this situation, the controller 62 of the adaptive authentication server 26 compares the user behavior data 94 to recent user behavior data 122 from the MMORPG provider 24 to generate a user behavior risk score 124 which is evaluated against a predefined user behavior threshold 126 (e.g., a tunable number between 0 and 1000). If the user behavior risk score 124 is lower than the user behavior threshold 126, the controller 62 gives a user behavior report 128 a first behavior value indicating that a possible fraudster situation is unlikely. However, if the user behavior risk score 124 is higher than the user behavior threshold 126, the controller 62 gives the user behavior report 128 a second behavior value indicating that a possible fraudster situation is unlikely and should be further investigated.

Likewise, it should be understood that additional evaluations are made to the data that is received from the MMORPG provider 24. Along these lines, intermediate risk results may be weighted and combined with other intermediate risk results to determine an overall risk score on a sliding continuous scale (e.g., between 0 and 1000). The particular position along the sliding continuous scale provides an indication of the risk associated with a particular user 30, i.e., the likelihood that a fraudster has compromised the user's account with the MMORPG provider 24. Further details will now be provided with reference to FIG. 4.

Figure 4:
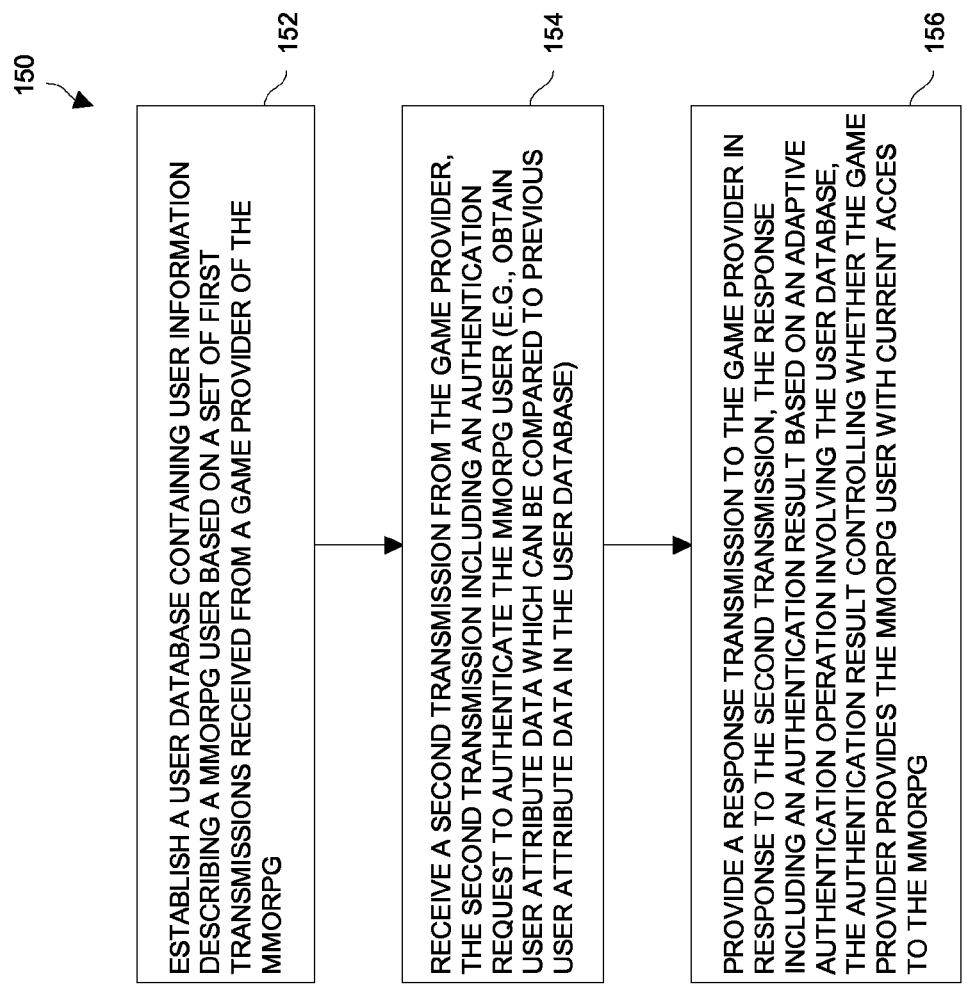
FIG. 4 is a flowchart of a procedure which is performed by the adaptive authentication server of FIG. 2.

FIG. 4 is a flowchart of a procedure 150 which is performed by the adaptive authentication server 26 of the MMORPG environment 20 (FIG. 1) for MMORPG user authentication. In step 152, the adaptive authentication server 26 establishes a user database containing user information describing the MMORPG user based on a set of first transmissions received from a game provider of the MMORPG. As mentioned earlier, such gathering of MMORPG user information may continue in an ongoing manner over time.

In step 154, the adaptive authentication server 26 receives a second transmission from the game provider. This second transmission includes an authentication request to authenticate the MMORPG user (e.g., during a login attempt by the MMORPG user). For example, the authentication request may include user attribute data (among other things) which the adaptive authentication server 26 compares with previous user attribute data in the user database.

In step 154, the adaptive authentication server 26 provides a response transmission to the game provider in response to the second transmission. The response transmission includes an authentication result based on an adaptive authentication operation involving the user database. The authentication result controls whether the game provider provides the MMORPG user with current access to the MMORPG. Accordingly, the game provider may catch and remove a fraudster posing as the MMORPG user thus providing a safer and less problematic environment for its MMORPG users.

Figure 5:
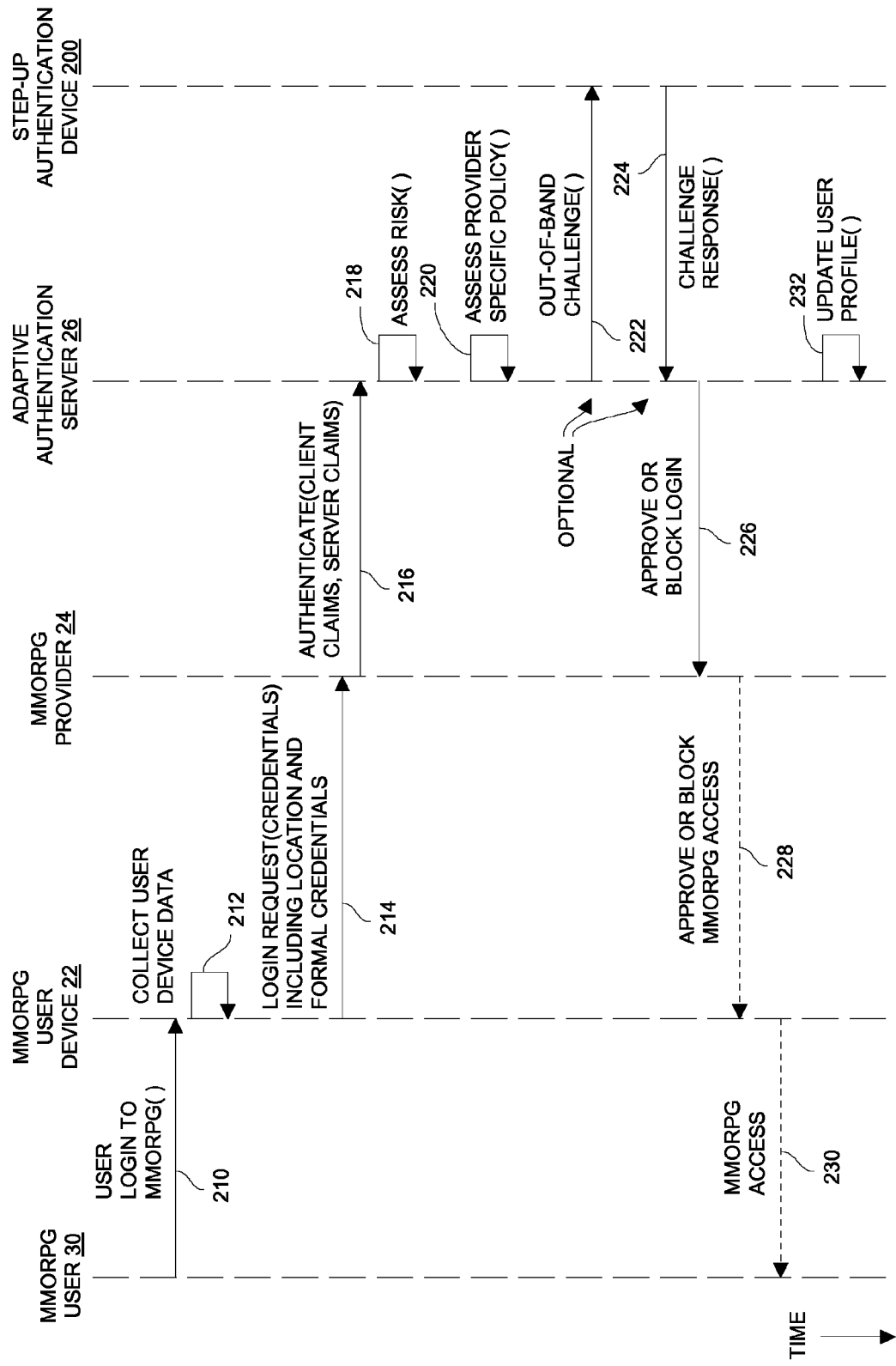
FIG. 5 is a sequence diagram illustrating various communications between components of the MMORPG environment of FIG. 1 during a user login attempt.

FIG. 5 shows a sequence diagram illustrating communications between certain components of the MMORPG environment 20 during a user login attempt. It should be understood that, optionally, the MMORPG environment 20 includes an out-of-band device 200 such as a user's cell phone, email service, etc. Time increases in the downward direction.

Initially, the user 30 operates the user device 22 to send a login request to the MMORPG provider 24 (arrows 210, 212 and 214). The user device 22 includes user device data (e.g., a device identifier, a certificate, a MAC address, location, other formal credentials, etc.) which uniquely identifies the user device 22 (arrow 212). The MMORPG provider 24 then provides an authentication request to the adaptive authentication server 26 perhaps with additional information such as an IP address, ISP information, and information regarding the user's application (e.g., a browser, etc.) (arrow 216), which assesses the risk (arrow 218) and perhaps performs additional operations which are predefined by the MMORPG provider 24 (arrow 220).

Optionally, the adaptive authentication server 26 is equipped to perform additional authentication operations. For example, the adaptive authentication server 26 can issue an out-of-band challenge to the user through the out-of-band device 200 (arrow 222). The out-of-band challenge requires that the user 30 provide an out-of-band response (arrow 224) using the out-of-band device 200 (e.g., a cell phone, email, SMS, etc.). In some arrangements, the challenge is a MMORPG user specific question that only the MMORPG user 30 should be able to answer. In some arrangements, the question may be specific to the MMORPG itself such as what year the MMORPG user 30 began a subscription, when the MMORPG user 30 last played, what item the MMORPG user 30 last purchased, and so on.

Next, the adaptive authentication server 26 makes a decision whether to approve or block the MMORPG user 30, and sends the result of that decision to the MMORPG provider 24 (arrow 226). Upon receipt of the decision, the MMORPG provider 24 either approves or blocks access to the MMORPG (arrows 228 and 230 which are shown as dashed arrows since access may be blocked). Such operation may include creation of a ticket for follow-up by a fraud department.

Additionally, the adaptive authentication server 26 updates its records in the user database 64 with data gathered during the user login attempt (arrow 232). Such information may include identification information of a new user device 22, a new location, and so on.

It should be understood that the exchanges are (i.e., arrows 250 through 268) are preferably performed during a user login attempt which occurs prior to a user play session. Additional, adaptive authentication occurs during the user place session as will now be described with reference to FIG. 6.

Figure 6:
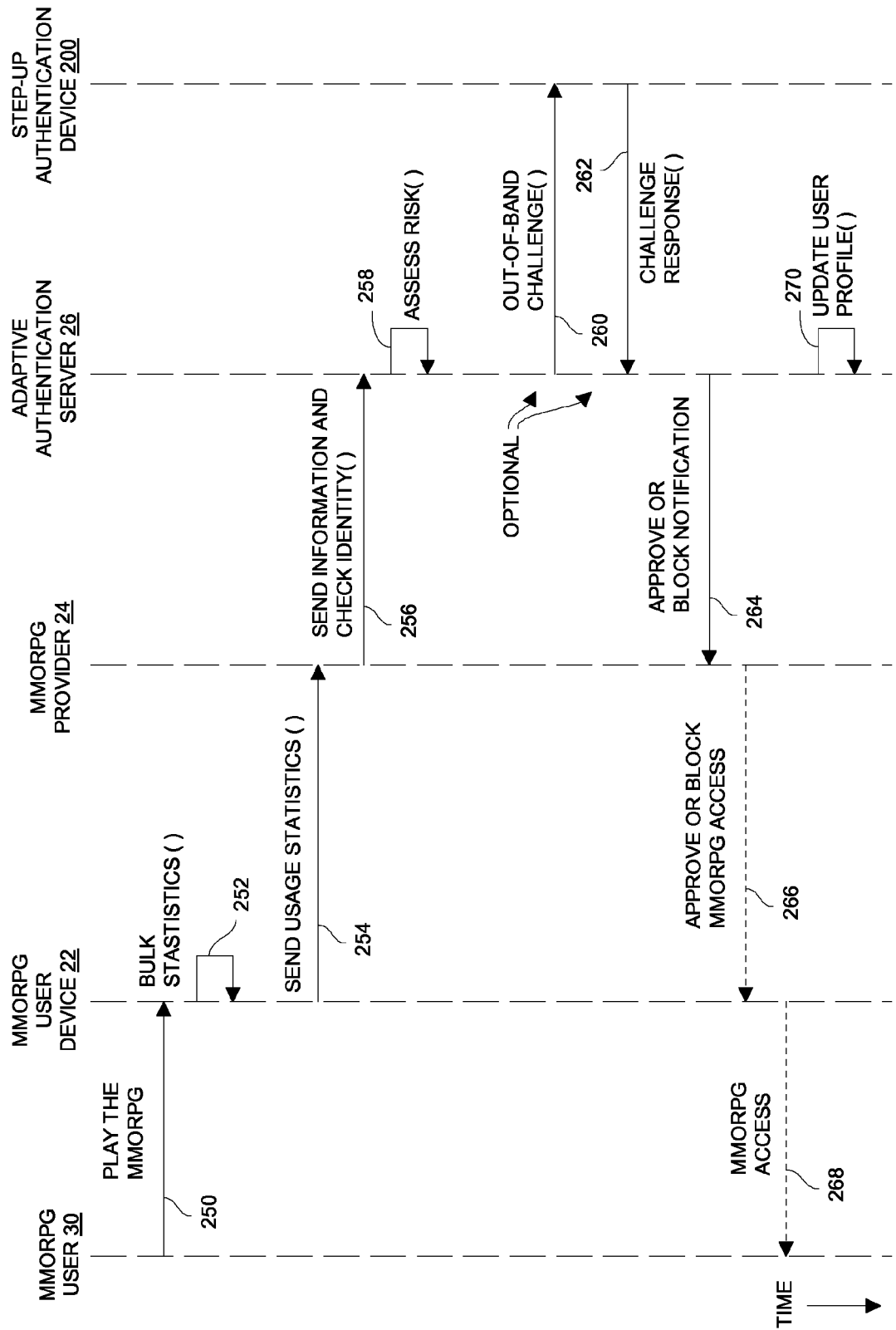
FIG. 6 is a sequence diagram illustrating various communications between components of the MMORPG environment of FIG. 1 during a user play session.

FIG. 6 shows a sequence diagram illustrating communications between certain components of the MMORPG environment 20 during a user play session. Again, the MMORPG environment 20 optionally includes an out-of-band device 200.

As shown in FIG. 6, the user 30 operates the user device 22 (arrow 250) which collects bulk statistics (arrow 252) and conveys this information to the MMORPG provider 24 over time (arrow 254). In turn, the MMORPG provider 24 provides information it periodically gathers to the adaptive authentication server 26 (arrow 256) along with a request to check the identity of the user 30. The adaptive authentication server 26 assess the risk based on the information (arrow 258).

As part of this risk assessment process, the adaptive authentication server 26 may optionally perform additional authentication operations. For example, as described above in the login session, the adaptive authentication server 26 can issue an out-of-band challenge to the user through the out-of-band device 200 (arrow 260), and requires that the user 30 provide an out-of-band response from the out-of-band device 200 (arrow 262). In some arrangements, the challenge is a MMORPG user specific question that only the MMORPG user 30 should be able to answer.

Subsequently, the adaptive authentication server 26 makes a decision whether to approve or block the MMORPG user 30, and sends the result of that decision to the MMORPG provider 24 (arrow 264). Upon receipt of the decision from the adaptive authentication server 26, the MMORPG provider 24 either approves or blocks access to the MMORPG (arrows 266 and 268 which are shown as dashed arrows since access may be blocked). Furthermore, the adaptive authentication server 26 updates its records in the user database 64 with data gathered during the user login attempt (arrow 270).

It should be understood that the exchanges (i.e., arrows 250 through 268) are preferably performed periodically during a single user play session. Additionally, the exchanges are (i.e., arrows 250 through 268) are preferably performed at least once during each user play session.

It should be further understood that the above-described that the involvement of the adaptive authentication server 26 in the user login session and in the user play session provides effective protection to the user 30 from identity theft and/or misuse of credit information. Also, such operation protects the MMORPG provider 24 from multiple users using the same account.

As mentioned above, an improved technique involves authenticating a user of a MMORPG using adaptive authentication. In particular, a MMORPG provider 24 exchanges information regarding its MMORPG users 30 with an adaptive authentication server 26 which performs adaptive authentication operations to catch and remove fraudsters. Such operations may involve analyzing a user's attributes (e.g., the user's device address, ISP address, location, etc.). Additionally, such operations may involve analyzing certain behavior characteristics of the user's playing sessions (e.g., a comparison of playing time of day, amount of playing time, playing speed, purchase habits, and other playing activity). Accordingly, the adaptive authentication server 26 is able to evaluate potential risks of fraud (i.e., generate risk scores) and provide input back to the MMORPG provider 24 to allow the MMORPG provider 24 to take action (e.g., contact the user, temporarily deny/disable the user's account, etc.).

While various embodiments of the invention have been particularly shown and described, it will be understood by those skilled in the art that various changes in form and details may be made therein without departing from the spirit and scope of the invention as defined by the appended claims.

For example, it should be understood that some of the operations of the adaptive authentication server 26 can be performed in a batch mode and encompass results of multiple MMORPG users 30. In some arrangements, user information is obtained routinely (e.g., during "give" intervals) and an evaluation of risks is performed periodically (e.g., each night, weekly, etc.). In these arrangements, the adaptive authentication server 26 provides a report back to the MMORPG provider 24 which covers multiple MMORPG users 30 at a time.

Additionally, it should be understood that the environment 20 was described above as being a MMORPG environment by way of example. Nothing precludes the environment 20 from detecting fraudsters, hackers and attackers in other game genres (e.g., online card games, trivia games, and so on). To the contrary, the concepts and techniques disclosed above can be applied to these other environments, and hybrid environments as well.

What is claimed is:

1. An adaptive authentication server to authenticate a user of a massive multiplayer online role playing game (MMORPG), the adaptive authentication server comprising:
an interface;
a user database; and
a controller coupled to the interface and the database, the controller comprising processing circuitry to execute an authentication program, the controller being constructed and arranged to:
store user information describing a MMORPG user in the user database based on a set of first transmissions received from a game provider of the MMORPG through the interface,
receive a second transmission from the game provider through the interface, the second transmission including an authentication request to authenticate the MMORPG user, and
providing, through the interface, a response transmission to the game provider in response to the second transmission, the response transmission including an authentication result based on an adaptive authentication operation involving the user database, the authentication result controlling whether the game provider provides the MMORPG user with current access to the MMORPG,
wherein the set of first transmissions received from the game provider of the MMORPG includes user data collected from the MMORPG user by the game provider while the game provider previously provided the MMORPG user with access to the MMORPG; and
wherein the controller, when storing the user information describing the MMORPG user in the user database, is constructed and arranged to populate a set of user attribute fields with information which is specific to the MMORPG user based on the user data collected from the MMORPG user by the game provider, the information populated in the set of user attribute fields forming at least a portion of a current user profile of the MMORPG user,
wherein the controller, when providing the response transmission to the game provider in response to the second transmission, is constructed and arranged to:
generate a risk score based, at least in part, on the information populated in the set of user attribute fields, and
give the authentication result (i) a first access value to grant current access to the MMORPG when the risk score is lower than a predetermined risk threshold, and (ii) a second access value to deny current access to the MMORPG when the risk score is higher than the predetermined risk threshold
wherein the set of user attribute fields includes a previous user address field which stores a previous user address of the MMORPG user; and
wherein the controller, when generating the risk score, is constructed and arranged to compare the previous user address of the MMORPG user to a current user address contained within the second transmission from the game provider to obtain a numerical intermediate risk result.

2. A adaptive authentication server as in claim 1 wherein the controller, when storing the user information describing the MMORPG user in the user database, is further constructed and arranged to populate a set of user behavior fields with user statistic information which is specific to the MMORPG user based on the user data collected from the MMORPG user by the game provider, the statistic information populated in the set of user behavior fields forming at least a portion of the current user profile of the MMORPG user; and
wherein the controller is further constructed and arranged to:
receive additional user statistic data collected from the MMORPG user by the game provider at a recent MMORPG play session of the user,
compare the statistic information populated in the set of user behavior fields with the additional user statistic data,
generate a risk score based, at least in part, on the comparison, and
provide the MMORPG a risk report to the game provider, the risk report indicating whether a critical user behavior deviation exists in the recent MMORPG play session of the user.

3. The method according to claim 1, wherein the game provider is remote from a user device and the controller.

4. A computer program product which includes a computer readable non-transitory storage medium storing instructions which, when executed on a computer, cause the computer to authenticate a user of a massive multiplayer online role playing game (MMORPG), the instructions including:
instructions to establish a user database containing user information describing a MMORPG user based on a set of first transmissions received from a game provider of the MMORPG;
instructions to receive a second transmission from the game provider, the second transmission including an authentication request to authenticate the MMORPG user; and
instructions to provide a response transmission to the game provider in response to the second transmission, the response transmission including an authentication result based on an adaptive authentication operation involving the user database, the authentication result controlling whether the game provider provides the MMORPG user with current access to the MMORPG,
wherein the set of first transmissions received from the game provider of the MMORPG includes user data collected from the MMORPG user by the game provider while the game provider previously provided the MMORPG user with access to the MMORPG; and
wherein the controller, when storing the user information describing the MMORPG user in the user database, is constructed and arranged to populate a set of user attribute fields with information which is specific to the MMORPG user based on the user data collected from the MMORPG user by the game provider, the information populated in the set of user attribute fields forming at least a portion of a current user profile of the MMORPG user, wherein the controller, when providing the response transmission to the game provider in response to the second transmission, is constructed and arranged to:

generate a risk score based, at least in part, on the information populated in the set of user attribute fields, and give the authentication result (i) a first access value to grant current access to the MMORPG when the risk score is lower than a predetermined risk threshold, and (ii) a second access value to deny current access to the MMORPG when the risk score is higher than the predetermined risk threshold, wherein the set of user attribute fields includes a previous user address field which stores a previous user address of the MMORPG user; and wherein the controller, when generating the risk score, is constructed and arranged to compare the previous user address of the MMORPG user to a current user address contained within the second transmission from the game provider to obtain a numerical intermediate risk result.

5. A method of authenticating a user of a massive multiplayer online role playing game (MMORPG), the method comprising:

based on a set of first transmissions received from a game provider of the MMORPG, establishing a user database containing user information describing a MMORPG user;

receiving a second transmission from the game provider, the second transmission including an authentication request to authenticate the MMORPG user; and providing a response transmission to the game provider in response to the second transmission, the response transmission including an authentication result based on an adaptive authentication operation involving the user database, the authentication result controlling whether the game provider provides the MMORPG user with current access to the MMORPG, wherein the set of first transmissions received from the game provider of the MMORPG includes user data collected from the MMORPG user by the game provider while the game provider previously provided the MMORPG user with access to the MMORPG; and wherein establishing the user database containing the user information includes populating a set of user attribute fields with information which is specific to the MMORPG user based on the user data collected from the MMORPG user by the game provider, the information populated in the set of user attribute fields forming at least a portion of a current user profile of the MMORPG user, wherein providing the response transmission to the game provider in response to the second transmission includes:

generating a risk score based, at least in part, on the information populated in the set of user attribute fields, and giving the authentication result (i) a first access value to grant current access to the MMORPG when the risk score is greater than a predetermined risk threshold, and (ii) a second access value to deny current access to the MMORPG when the risk score is less than the predetermined risk threshold, wherein the set of user attribute fields includes a previous user address field which stores a previous user address of the MMORPG user; and wherein generating the risk score includes comparing the previous user address of the MMORPG user to a current user address contained within the second transmission from the game provider to obtain a numerical intermediate risk result.

6. A method as in claim 5 wherein the previous user address is a device specific identifier of an electronic device used by user when the user previously accessed the MMORPG; and wherein the current user address is a current device specific identifier that the game provider obtained during a user login session.

7. A method as in claim 5 wherein the previous user address is an Internet Service Provider (ISP) address through which the user previously accessed the MMORPG; and wherein the current user address is a current ISP address that the game provider obtained during a user login session.

8. A method as in claim 5 wherein the previous user address is a WiFi identified geographic location from which the user previously accessed the MMORPG; and wherein the current user address is a current WiFi identified geographic location that the game provider obtained during a user login session.

9. A method as in claim 5 wherein the set of user attribute fields includes a previous token field which stores a previous token stored in a tracking cookie in an electronic device used by the MMORPG user; and wherein generating the risk score includes comparing the previous token of the MMORPG user to a current token contained within the second transmission from the game provider to obtain a second numerical intermediate risk result.

10. A method as in claim 5 wherein establishing the user database containing the user information further includes populating a set of user behavior fields with user statistic information which is specific to the MMORPG user based on the user data collected from the MMORPG user by the game provider, the statistic information populated in the set of user behavior fields forming at least a portion of the current user profile of the MMORPG user; and wherein the method further comprises:

receiving additional user statistic data collected from the MMORPG user by the game provider at a recent MMORPG play session of the user, comparing the statistic information populated in the set of user behavior fields with the additional user statistic data, generating a risk score based, at least in part, on the comparison, and providing the MMORPG a risk report to the game provider, the risk report indicating whether a critical user behavior deviation exists in the recent MMORPG play session of the user.

11. A method as in claim 10 wherein the statistic information populated in the set of user behavior fields includes an average length of play;

wherein the additional user statistic data collected from the MMORPG user by the game provider at the recent MMORPG play session includes a recent length of play for that recent MMORPG play session; and wherein generating the risk score includes providing (i) a high risk score indicating a high risk when the recent length of play exceeds the average length of play by a predefined time-length threshold, and (ii) a low risk score indicating a low risk when the recent length of play does not exceed the average length of play by the predefined time-length threshold.

12. A method as in claim 10 wherein the statistic information populated in the set of user behavior fields includes an average speed of play based on a predefined activity frequency;
    wherein the additional user statistic data collected from the MMORPG user by the game provider at the recent MMORPG play session includes a recent speed of play for that recent MMORPG play session, the recent speed of play being based on the predefined activity frequency; and
    wherein generating the risk score includes providing (i) a high risk score indicating a high risk when the deviation between the average speed of play and the recent speed of play is large, and (ii) a low risk score indicating a low risk when the deviation between the average speed of play and the recent speed of play is small.

13. A method as in claim 10 wherein the statistic information populated in the set of user behavior fields includes an average time of day of play;
    wherein the additional user statistic data collected from the MMORPG user by the game provider at the recent MMORPG play session includes a recent time of day of play for that recent MMORPG play session; and
    wherein generating the risk score includes providing (i) a high risk score indicating a high risk when the recent time of day of play exceeds the average time of day of play by a predefined time-of-day threshold, and (ii) a low risk score indicating a low risk when the recent time of day of play does not exceed the average time of day of play by the predefined time-of-day threshold.

14. A method as in claim 10 wherein the statistic information populated in the set of user behavior fields includes an average microtransaction purchase amount;
    wherein the additional user statistic data collected from the MMORPG user by the game provider at the recent MMORPG play session includes a recent microtransaction purchase amount for that recent MMORPG play session; and
    wherein generating the risk score includes providing (i) a high risk score indicating a high risk when the recent microtransaction purchase amount exceeds the average microtransaction purchase amount by a predefined purchase amount threshold, and (ii) a low risk score indicating a low risk when the recent microtransaction purchase amount does not exceed the average microtransaction purchase amount by the predefined purchase amount threshold.

15. A method as in claim 10 wherein the risk report includes risk scores for multiple users of the MMORPG; and
    wherein providing the MMORPG the risk report to the game provider includes conveying the risk scores for the multiple users of the MMORPG to the game provider to identify potential user fraud in the MMORPG.

\* \* \* \* \*